United States Patent [19]

Furmanek et al.

[11] Patent Number: 4,684,266
[45] Date of Patent: Aug. 4, 1987

[54] SLIDE AND WAY ASSEMBLY AND METHOD OF MAKING SAME

[75] Inventors: Robert A. Furmanek, Maple Heights; Jyoti P. Mukherjee, North Royalton; Pasquale J. Lanese, Mayfield Heights, all of Ohio

[73] Assignee: The Warner & Swasey Company, Cleveland, Ohio

[21] Appl. No.: 925,014

[22] Filed: Oct. 30, 1986

[51] Int. Cl.⁴ .............................................. F16C 29/02
[52] U.S. Cl. ........................................ 384/37; 384/25; 384/41
[58] Field of Search .............. 384/37, 25, 41, 39, 384/54, 59

[56] References Cited

U.S. PATENT DOCUMENTS

| | | |
|---|---|---|
| 1,872,718 | 8/1932 | Flanigan . |
| 2,593,230 | 4/1952 | Walter ........................... 384/39 |
| 2,675,276 | 4/1954 | Daugherty . |
| 2,832,651 | 4/1958 | Berthicz . |
| 3,054,645 | 9/1962 | Evans . |
| 3,749,509 | 7/1973 | Lukoshnikov .................. 408/234 |
| 4,068,906 | 1/1978 | Dur/Forster . |
| 4,080,009 | 3/1978 | Marathe et al. . |
| 4,114,945 | 9/1978 | Lutz ............................... 384/37 |
| 4,191,367 | 3/1980 | Speiser et al. .................. 384/42 |
| 4,504,096 | 3/1985 | Roch .............................. 384/39 |
| 4,534,093 | 8/1985 | Jahnke et al. .................. 29/26 A |

Primary Examiner—Lenard A. Footland
Attorney, Agent, or Firm—Thomas K. Ziegler; Raymond J. Eifler

[57] ABSTRACT

A slide (20) having conveniently removable and replaceable bearing components (28–38) with the bearing components engaging seats (50) made of resilient, low friction material. The slide is supported on ways (24, 26) by way bearing pads (28–32) and opposed adjustable bearing assemblies (34–38). The seats (50) are formed by rough machining pockets (40, 42) into slide (20), positioning the slide (20) onto the ways (24, 26), positioning tooling blocks (60) at the locations normally occupied by the bearing components (28–36), and filling the spaces between the tooling blocks and pockets with a low friction, epoxy material, thereby forming the seats (50). Any one of the bearing components (28–38) may be removed and replaced without removing the slide (20) from the ways (24, 26). Further, each bearing assembly (34, 38) is mounted on one side of a respective way with a way bearing pad (28–32) being mounted on the opposite side of the way. Moreover, each bearing assembly (34–38) includes an adjustable tapered gib (54) that is sandwiched between a seat (50) and a bearing pack (56) that engages a way (24 or 26).

7 Claims, 11 Drawing Figures

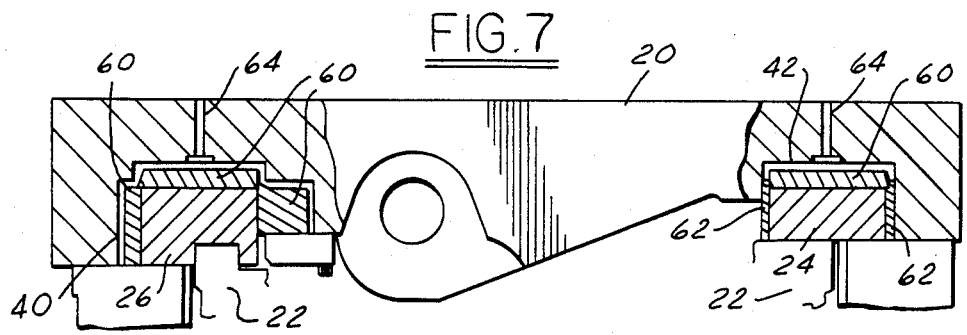
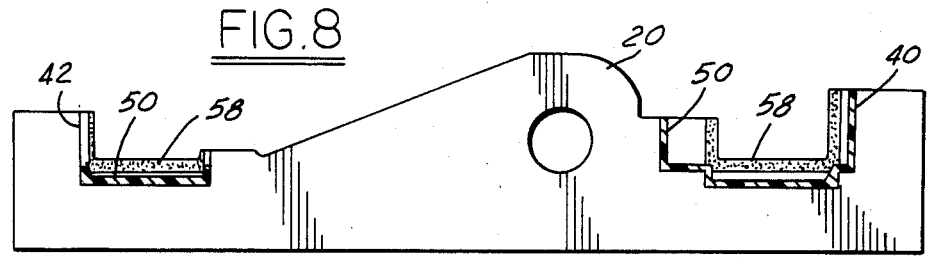
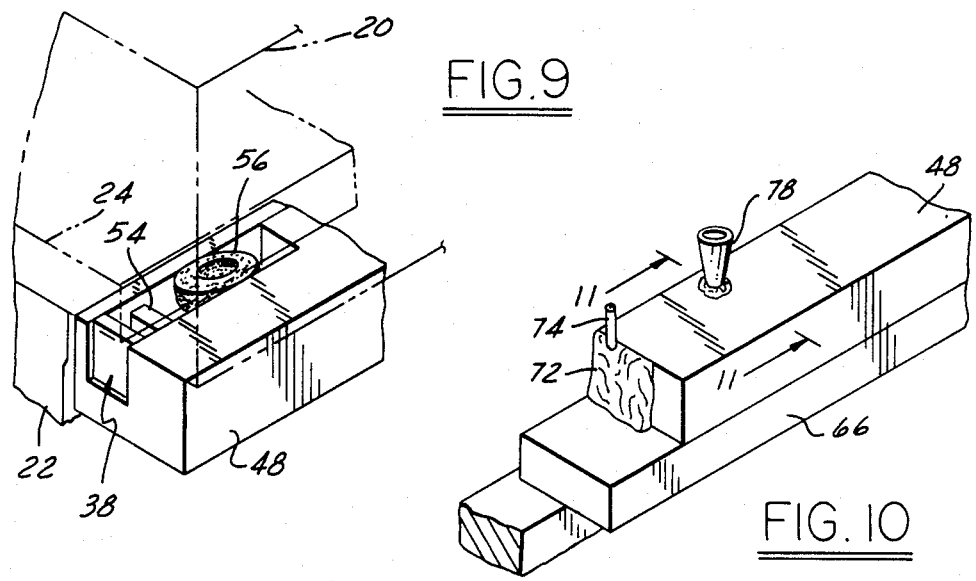
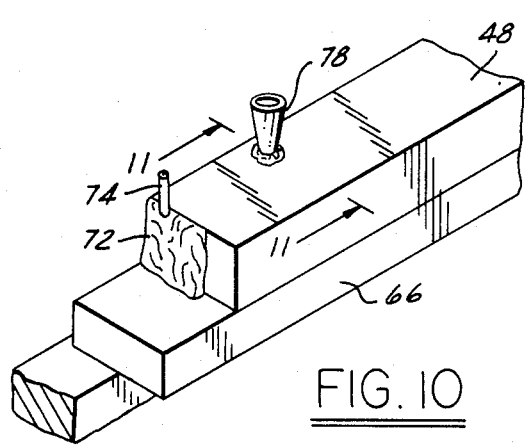
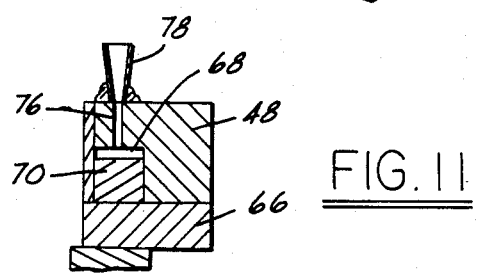

SLIDE AND WAY ASSEMBLY AND METHOD OF MAKING SAME

The present invention relates to a slide and way assembly and method that eliminates expensive machining of the slide, provides for convenient removability of the bearing components without removing the slide from the ways, and reduces overall friction and vibration in the system.

BACKGROUND OF THE INVENTION

For high precision machinery, the tool must be held stable while it is moved through precise motion increments as in, for example, turning, milling, drilling, or boring operations. Thus, the slide must also be stable and operable in a smooth and efficient manner for such operations. To provide the necessary stability and efficiency of operation for the slide, precise machining operations have previously been performed on it to form exact mating surfaces between it and the bearing components that support the slide on guide ways. These machining operations, to obtain the exact alignment required between the slide and the ways, are quite expensive and time consuming and subject to error. Thus, there has been a need for a construction and method that eliminates the need for such precise machining operations on the slide.

In order to maintain the exact alignment between the slide and ways, the bearing components must periodically be removed and replaced. This is expensive and time consuming because the slide must be removed from the ways to replace the bearing components, which makes it necessary to realign the slide on the ways after the bearing components were replaced. Thus, there has been a need for a construction that eliminates the requirement of removing the slide from the ways when bearing components are replaced.

Further, smooth and efficient operation of the slide and way assembly requires a low frictional drag combined with damping. Thus, there is a continuing need for constructions and methods that reduce and minimize the overall friction and vibration in a slide and way assembly.

An example of a slide and way assembly that has these shortcomings may be found in U.S. Pat. No. 2,675,276 issued April 13, 1954, entitled "Sliding Way for Machine Tools and Method of Making Same".

SUMMARY OF THE INVENTION

This invention is a slide and way assembly and a method of forming precise bearing surfaces that eliminates expensive machining of the slide, provides for convenient removability of the bearing components without removing the slide from the ways, and reduces overall friction and vibration in the system.

The slide and way assembly includes conveniently removable and replaceable bearing components with the bearing components engaging low friction material seats. The slide is supported on ways by way bearing pads and opposed bearing assemblies that are supported by retainers. Each bearing assembly is mounted on one side of a respective way with a way bearing pad being mounted on the opposite side of the way. Further, the bearing assemblies each include an adjustable tapered gib that is sandwiched between the low friction material seat and a bearing pack that engages the way.

The method of making a slide and way assembly includes the steps of initially rough machining the slide to form pockets at the locations where the bearing pads are. After machining, the slide is placed on the ways and aligned relative thereto. Tooling blocks, which simulate the size and configuration of the way pads and bearing assemblies, are placed into the same position that the actual pads and bearing assemblies will later occupy. An epoxy based material is poured into the spaces between the tooling blocks and walls of the slide pockets to form seats for the way pads and one of the bearing assemblies. The seats for the other bearing assemblies are formed in a separate pouring step. After the epoxy material has cured, the tooling blocks are removed, the slide is repositioned on the ways, and the actual pads and bearing assemblies are mounted thereto. Thereafter, if any one of the bearing components requires replacement, it can be removed and replaced without removing the slide from the ways.

Accordingly, an advantage of the invention resides in the use of low friction, epoxy material to form seats for the bearing components, thereby eliminating the need for precise machining of the slide pockets to obtain the precise alignment with the ways that is required for smooth and efficient operation.

Another advantage of the invention resides in the ability to remove and replace the bearing components without removing the slide from the ways.

Still another advantage of the invention resides in positioning the bearing assemblies opposite the way bearing pads which provides greater overall stiffness and damping of any vibration in the system.

DETAILED DESCRIPTION OF THE INVENTION

FIGS. 1-3 illustrate the slide and way assembly of the present invention wherein:

FIG. 1 is a top plan view of a slide and way assembly employing the present invention;

FIG. 2 is an end view of the slide and way assembly with certain portions removed to permit easier viewing;

FIG. 3 is a side cross-sectional view of a typical bearing assembly;

FIGS. 4-11 illustrate the method of making a slide and way assembly of the present invention wherein:

FIG. 4 is a perspective view of the slide after the rough machining step;

FIG. 5 is a partial plan view of the slide illustrating the step of forming dams at the ends of the slide pockets;

FIG. 6 is an end view taken along line 6—6 in FIG. 5;

FIG. 7 is an end view, partially in cross-section, illustrating the step of utilizing tooling blocks prior to the pouring step;

FIG. 8 is an end view of the slide illustrating the pockets of the slide after the pouring step;

FIG. 9 is a perspective view again illustrating a conventional bearing assembly;

FIG. 10 is a perspective view of one of the retainers for the bearing assemblies illustrating the pouring step for forming a seat of low friction material; and FIG. 11 is a cross-sectional view taken along line 11—11 in FIG. 10.

SLIDE AND WAY ASSEMBLY

Figure 1:
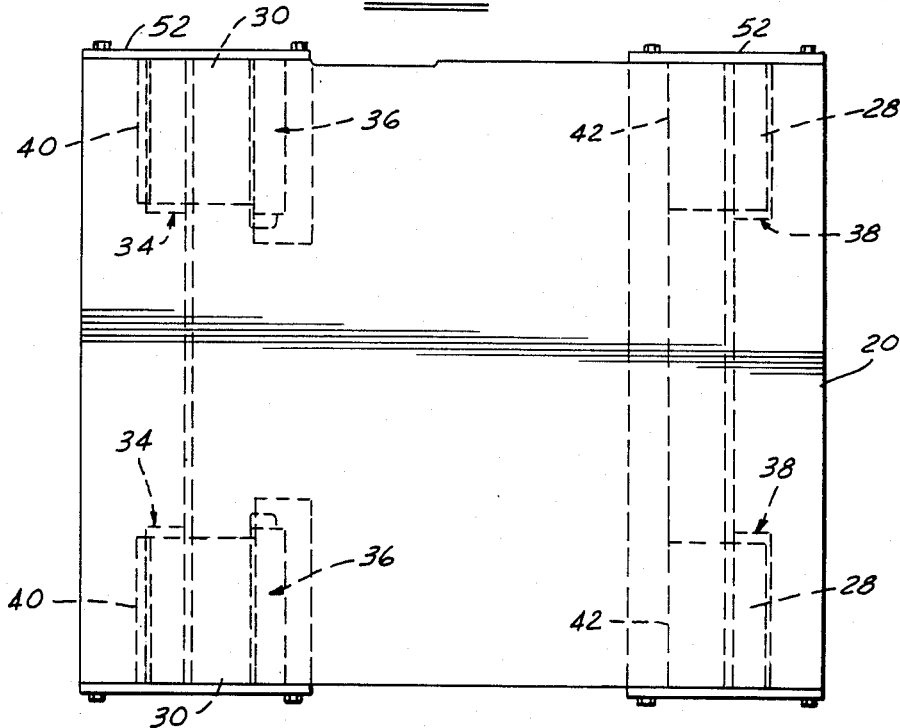
Figure 2:
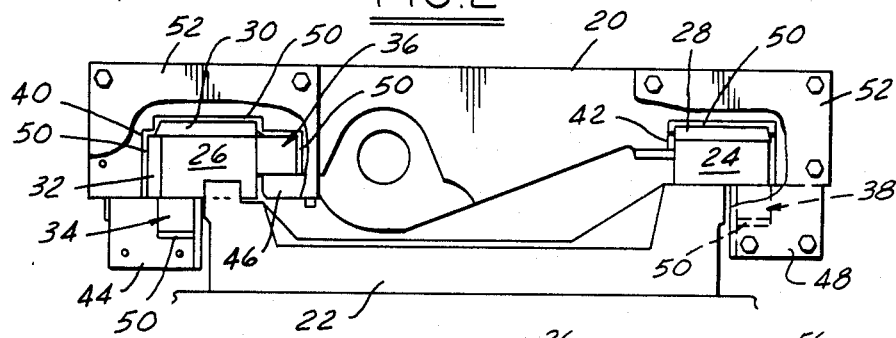

Referring now to the drawings, FIGS. 1 and 2 illustrate a slide or carriage 20 mounted on a way block 22 that includes a retaining way 24 and a guide way 26. The slide is supported by the ways 24 and 26 by way bearing pads 28, 30, 32 and by bearing assemblies 34, 36, and 38. The guide way side of the slide 20 includes pockets 40 at its opposite ends for receiving the way bearing pads 30, 32 and bearing assemblies 34, 36 that engage the guide way 26. Similarly, the retaining way side of slide 20 includes pockets 42 at its opposite ends for receiving the way bearing pads 28 and bearing assemblies 38 that engage the retaining way 24. The bearing assemblies 34, 36, 38 are secured in place by retainers 44, 46, and 48 respectively.

A low friction epoxy resin-filled material such as "Devcon WR" is bonded to selected surfaces of pockets 40, 42 and retainers 44, 48 for forming resilient seats 50 for the way bearing pads 28, 30, 32 and bearing assemblies 34, 36, and 38. As will be described, a method has been developed for precisely forming the epoxy material seats 50, thereby eliminating expensive machining of the pockets 40 and 42 in slide 20, which was required previously. Further, the epoxy material seats 50 permit the removal of the way bearing pads 28, 30, 32 and bearing assemblies 34, 36, 38 for replacement or repair without the need for removing the slide 20 from the ways 24 and 26. This may be accomplished by simply removing end caps 52 which permits access to the way pads and bearing assemblies for removal and replacement while the slide 20 remains in place on ways 24 and 26.

Figure 3:
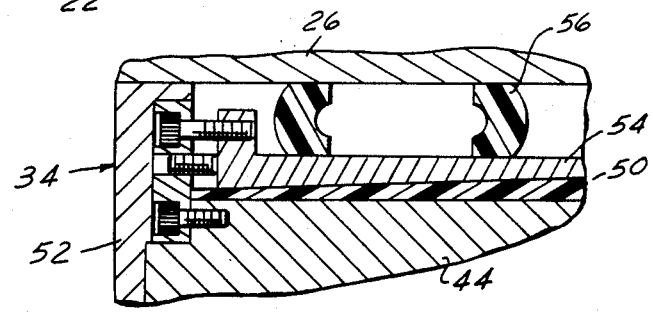

Referring to FIG. 3, one of the bearing assemblies 34 is shown in cross-section, however, the following description is also applicable to the other bearing assemblies 36 and 38 since all of the bearing assemblies are identical in construction. Each bearing assembly includes an adjustable tapered gib 54 and a linear roller bearing pack 56 such as a "TYCHOWAY" bearing pack which engages a surface of one of the ways 24 or 26. Tapered gib 54 is sandwiched between a bearing pack 56 and the epoxy material seat 50 which permits a fine preload adjustment and the ability to operate with a slight preload on the ways. Further, this construction permits damping of the slide 20 to reduce the amplitude of vibrations from, for example, a metal cutting tool that may be operating at high speeds and feeds. Moreover, each of the bearing assemblies 34, 36, 38 is opposed by a way bearing pad 28, 30, or 32, which provides greater overall stiffness to the system with lower overall friction.

METHOD OF MAKING SLIDE AND WAY ASSEMBLY

Figure 4:
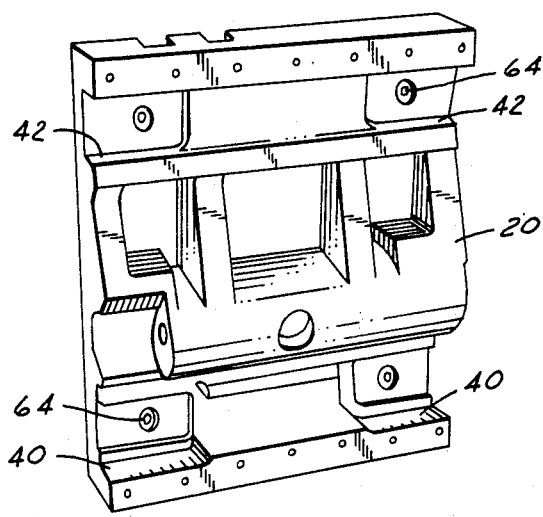

FIG. 4 illustrates the slide 20 after the pockets 40, 42 have been rough machined. Preliminarily, it should be noted that the present invention obviates the need for precise and expensive machining of the slide pockets 40 and 42, which would normally be required in order to obtain the critical alignment between the slide, ways, and bearings for proper operation. The slide pockets 40 and 42 are initially rough machined into configurations as shown in FIG. 4.

Figure 5:
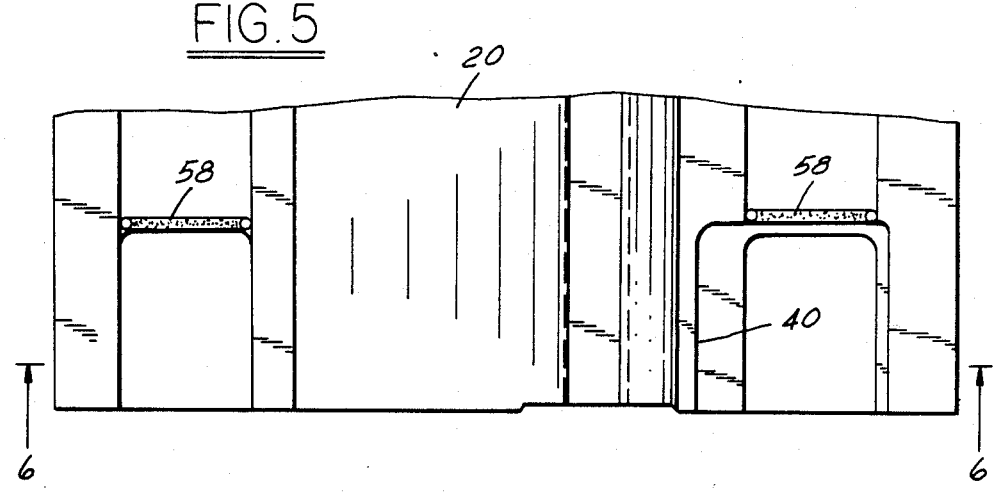
Figure 6:
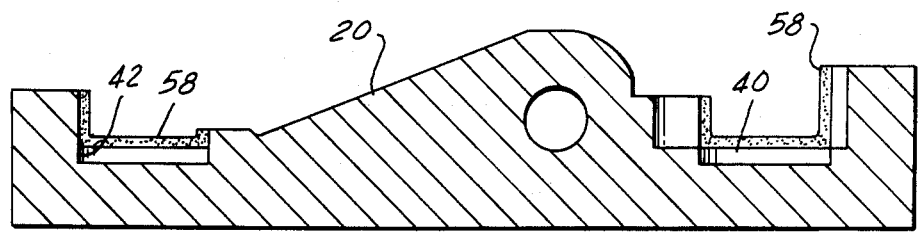

Referring to FIGS. 5 and 6, after the pockets 40, 42 have been rough machined into slide 20, foam rods 58 are then secured adjacent the inner ends of the pockets 40 and 42 to limit the flow of the epoxy material 50 during the pouring step.

The next steps in the method for forming the Teflon-based seats 50 within pockets 40, 42 and on retainers 44, 48 are best understood by reference to FIG. 7. After the foam rods 58 are in place, the slide 20 is placed onto the ways 24 and 26 for alignment. Slide 20 is carefully aligned with ways 24, 26 and then tooling blocks 60, which simulate size and configuration of the way pads 28, 30, 32 and the bearing assembly are placed into the same positions that the real pads and bearing assembly will occupy after the epoxy material is poured to form seats 50. Further, the sidewalls of pockets 42 are lined with foam tape 62 so that after the pouring and curing step, the tape can be removed to leave air gaps on the opposite sides of way 24.

Slide 20 includes pouring opening 64 to permit epoxy-based epoxy material to be poured into the spaces between the tooling blocks 60 and walls of pockets 40 and 42 to form the seats 50 for the way pads 28, 30, and 32 and bearing assembly 36. After the epoxy material is poured into opening 64 for filling the spaces between blocks 60 and pockets 40, 42, it is allowed to cure and then the slide and blocks are removed from ways 24 and 26.

FIG. 8 illustrates the formed seats 50 for the slide pockets 40 and 42 after the pouring and curing step. The foam rods 58 are removed and precisely formed seats 50 remain. Thus, whereas previously the bearing surfaces had to be precisely machined, which was a considerable expense and a substantial effort, the seats of the present invention are formed with minimal expense and effort. Further, as described previously, the present construction permits the way pads and bearing assemblies to be removable for replacement and repair without requiring removal of the slide 20 from ways 24 and 26. Moreover, the overall friction in the system is reduced, and the system damping is improved with the combination of elements as set forth herein.

Referring now to FIGS. 9-11, wherein FIG. 9 again illustrates one of the bearing assemblies 38 supported by retainer 48, the method for forming the seats 50 on the retainers 44 and 48 will be described. The following method is being described in connection with retainer 48, however, it should be understood that the same method is utilized to form a seat 50 on the other retainer 44 as well. FIGS. 10 and 11 illustrate retainer 48 on a work surface 66 such that the cavity 68 normally filled by bearing assembly 38 is occupied, in part, by a tooling block 70. Prior to the pouring step, the ends of retainer 48 are sealed with material 72 and a breather tube 74 is inserted therein to ensure that during the pouring step, the epoxy material fills the entire space between tooling block 70 and cavity 68. Retainer 48 includes an opening 76 therein to permit pouring of the epoxy material into the space between tooling block 70 and cavity 68. During the pouring step, the epoxy material is poured into a pouring tube 78 and flows through opening 76 into the space between block 70 and cavity 68 for forming a seat 50 on retainer 48 for bearing assembly 38. The same procedure is utilized to form a seat 50 for bearing assembly 34 on retainer 44.

We claim:

1. In combination with a slide and way assembly of the type having a slide (20) supported on ways (24, 26) and bearing components (28-38) for supporting said slide (20) on said ways (24, 26) and engaging said ways, the improvement comprising;
   means (50) for releasably mounting said bearing components (28-38) whereby said bearing components (28-38) are removable from the assembly without removing said slide (20) from said ways (24, 26).

2. The slide and way assembly of claim 1 wherein said releasable mounting means comprising resilient, low friction material seats (50) which support said bearing components (28-38).

3. The slide and way assembly of claim 2, wherein said low friction material includes epoxy.

4. The slide and way assembly of claim 1 wherein said bearing components (28-38) includes bearing pads (28-32) and bearing assemblies (34-38), with each bearing pad engaging one side of a respective way (24, 26) and a bearing assembly engaging an opposite side of the same way.

5. The slide and way assembly of claim 4 wherein said releasable mounting means comprises resilient, low friction material seats (50) which support said bearing components (28-38).

6. The slide and way assembly of claim 5 wherein each bearing assembly (34-38) including a bearing means (56) and an adjustable gib means (54) with the adjustable gib means supported on one of said resilient seats (50) and being sandwiched between said seat and said bearing means (56).

7. The slide and way assembly of claim 5 wherein said slide means (20) including pockets (40, 42) adjacent its corners and said low friction material being poured into said pockets to form said seats (50), and said bearing pads (28-32) sandwiched between said seats within said pockets and a respective way (24, 26).

* * * * *